July 20, 1965 P. L. WARD ETAL 3,195,242
TEACHING APPARATUS
Filed Oct. 26, 1962 6 Sheets-Sheet 1

INVENTORS
PHILLIP L. WARD
WARREN H. WARD, JR.
BY Charles B. Cannon
Their Att'y.

July 20, 1965  P. L. WARD ETAL  3,195,242
TEACHING APPARATUS
Filed Oct. 26, 1962  6 Sheets-Sheet 2
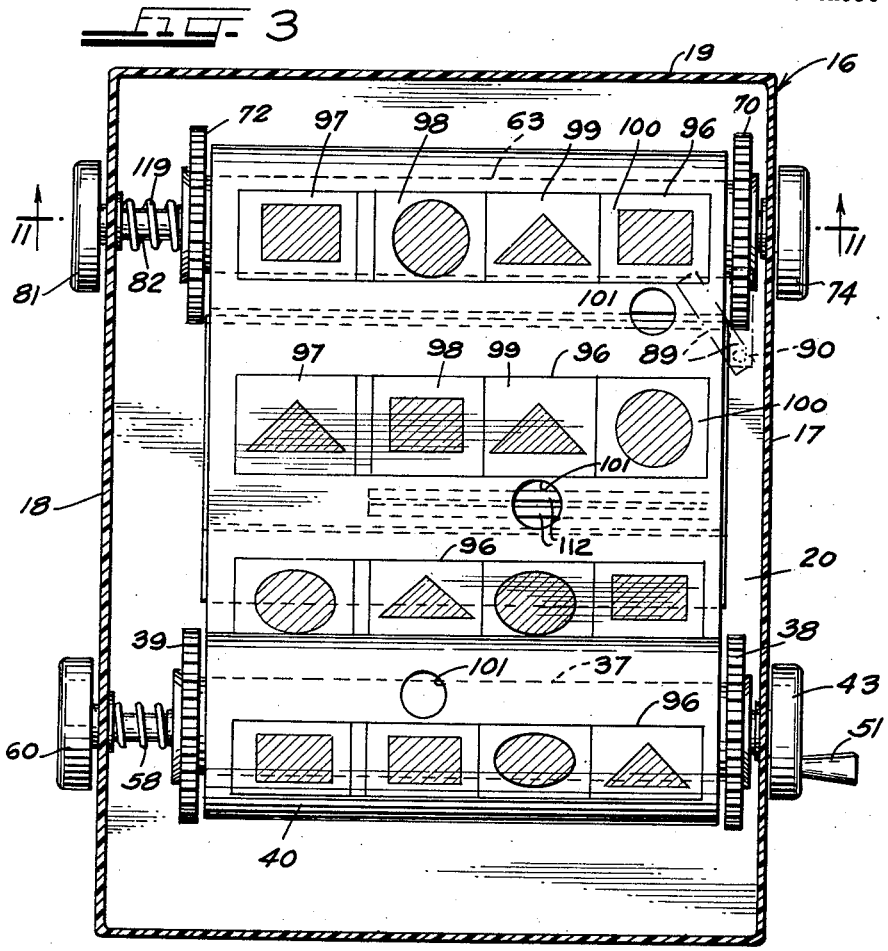
INVENTORS
PHILLIP L. WARD
WARREN H. WARD, JR.
BY
Charles B. Cannon
Their Att'y July 20, 1965

P. L. WARD ETAL 3,195,242

TEACHING APPARATUS

Filed Oct. 26, 1962

INVENTORS
PHILLIP L. WARD
WARREN H. WARD, JR.
BY
Charles B. Cannon
Their Att'y

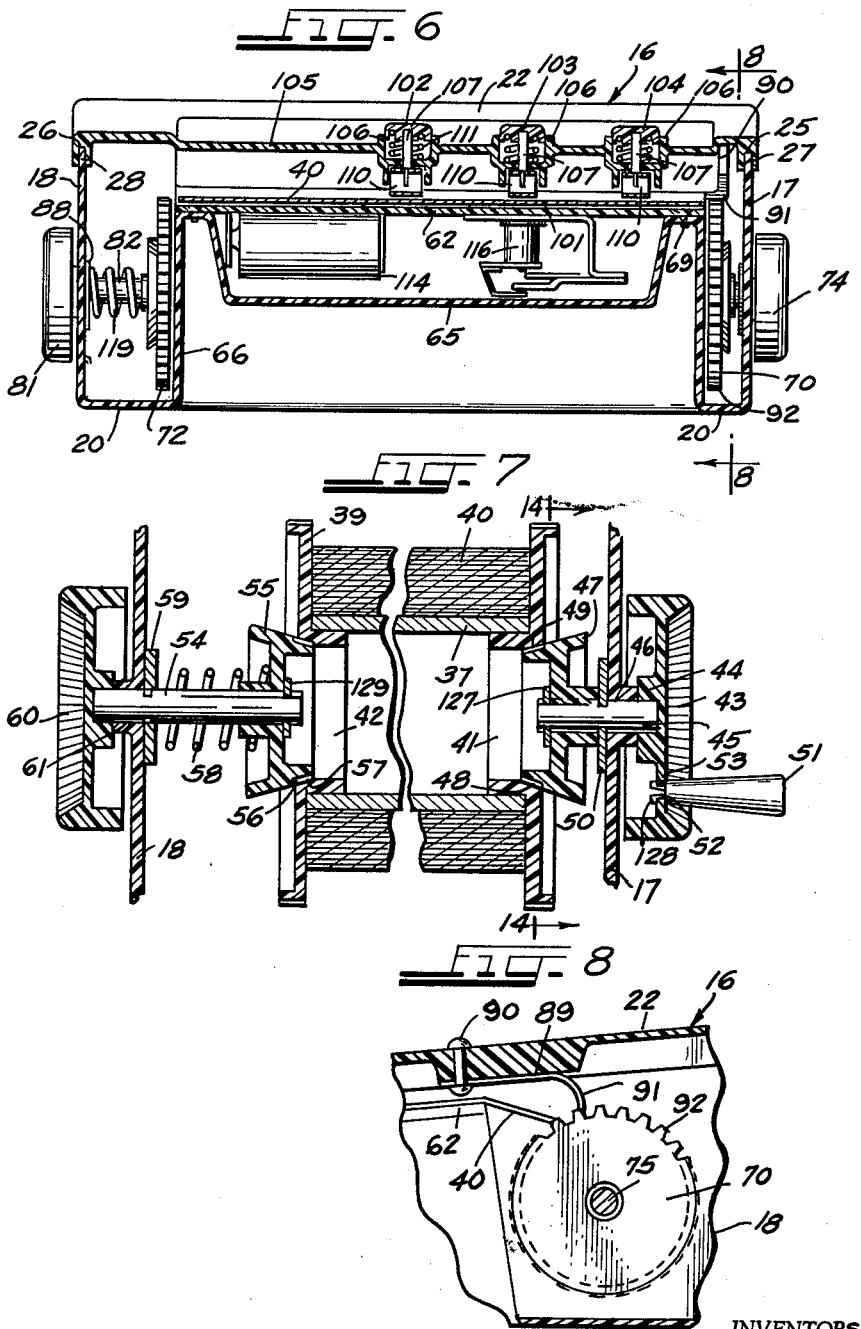

July 20, 1965  P. L. WARD ETAL  3,195,242
TEACHING APPARATUS
Filed Oct. 26, 1962  6 Sheets-Sheet 5
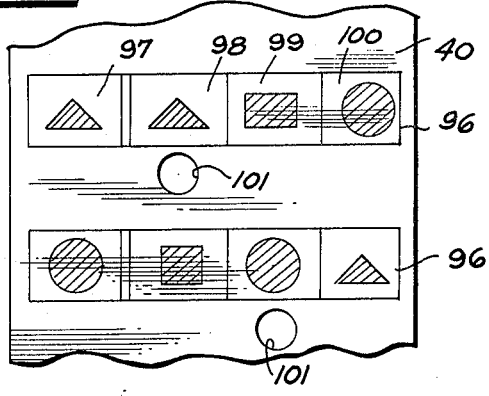
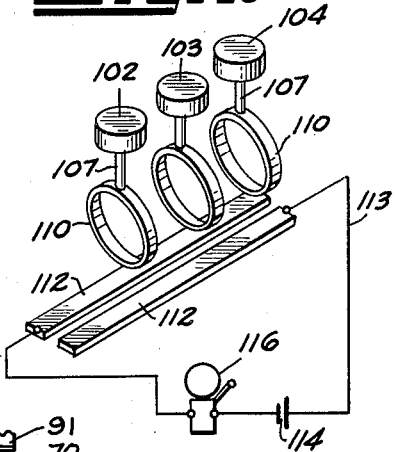
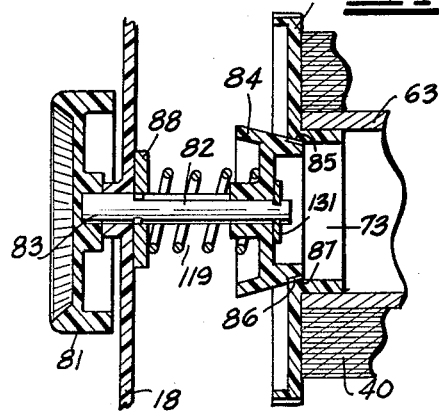
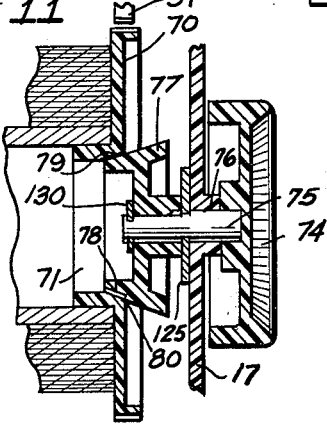
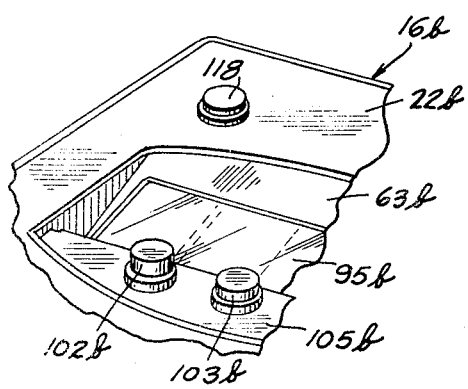
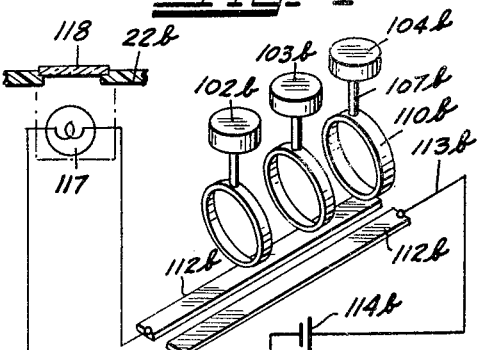
INVENTORS
PHILLIP L. WARD
WARREN H. WARD, JR.
BY
Charles B. Cannon
Their Atty.

July 20, 1965  P. L. WARD ETAL  3,195,242
TEACHING APPARATUS
Filed Oct. 26, 1962  6 Sheets-Sheet 6
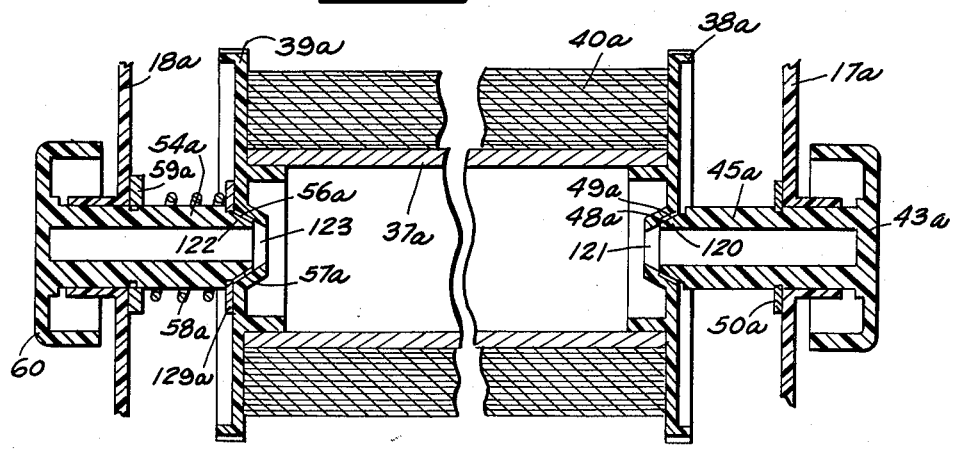
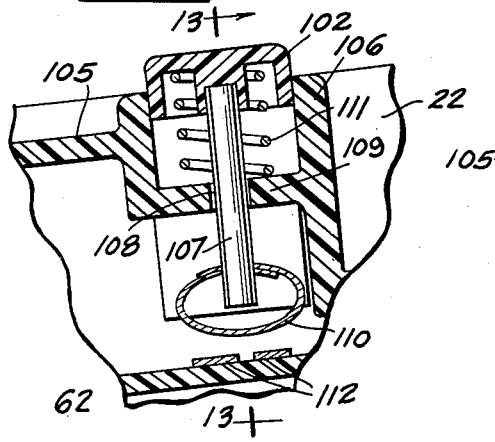
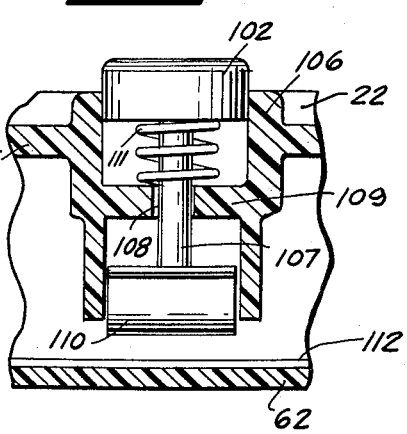
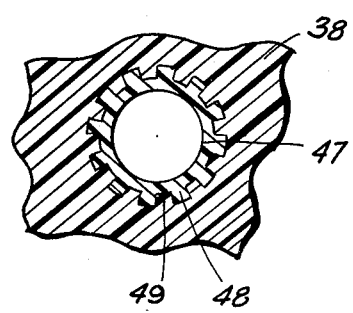
INVENTORS
PHILLIP L. WARD
WARREN H. WARD, JR
BY
Charles D. Cannon
Their Att'y.

United States Patent Office 3,195,242
Patented July 20, 1965

3,195,242
TEACHING APPARATUS
Phillip L. Ward, 220 Shadowood Lane, Northbrook, Ill., and Warren H. Ward, Jr., 2963 Payne, Evanston, Ill.
Filed Oct. 26, 1962, Ser. No. 233,351
2 Claims. (Cl. 35—9)

This invention relates to a teaching apparatus and, more particularly, to a teaching apparatus of the so-called multiple-choice or multiple-choice answer type which may be used for teaching children of grammer school age.

An object of the invention is to provide a new and improved so-called multiple-choice or multiple-choice answer teaching apparatus which is relatively simple and inexpensive in construction and simple in operation so that it may be operated by children in the lower elementary or grammar school grades.

An additional object of the invention is to provide a new and improved multiple-choice or multiple-choice answer teaching apparatus embodying a novel combination of parts for determining when the correct answer is given by a child to a so-called multiple-choice answer question and for informing the child as to whether or not he or she has given the correct answer to the question.

Other objects of the invention are: to provide a novel design and construction of housing for the new teaching apparatus and a novel arrangement of the parts embodied therein which are particularly adapted for use by a child; to provide a novel construction of the feed roller unit and of the take-up roller unit embodied in the new teaching apparatus; to provide a novel combination and arrangement of parts including a novel question and answer-bearing paper web provided with longitudinally spaced laterally offset circuit-closing holes or apertures and a novel arrangement of manually operable circuit-closing switches operable by a child using the new teaching apparatus and including circuit-closing means adapted to be projected through one of said holes or apertures for the purpose of closing an electrical circuit to an audible or a visible signal device if the child makes the proper selection of the answer, from a multiple-choice of answers on the paper web, to a question also on the paper web, the question and the multiple-choice of answers thereto being arranged in a row of frames on the paper web and being visible through a sight window in the top or cover of the housing; to provide a novel construction and arrangement of the guideway for the paper web and of its association with the sight window in the top or cover of the housing through which the child is able to view a single question and a multiple choice of answers thereto on a portion of the paper web which is disposed upon the guideway and below the sight window in the top or cover of the cabinet, together with a novel design and construction of the housing for supporting the guideway; to provide a novel latching mechanism for the take-up roller in the new teaching apparatus to enable the parent of a small child to manually release the latching means for the take-up roller so that the question and answer-bearing web may be moved forward and backward in the housing of the unit should a small child experience difficulty in properly positioning a row of question and answer-bearing frames on the paper web relative to the sight window in the top or cover of the housing; to provide a novel design and construction of the housing embodied in the new teaching apparatus including a novel design and construction of the top wall or cover and the sight window therein and a novel design and construction of the bottom wall of the housing to provide novel means for housing and supporting certain of the operating parts of the new teaching apparatus and to minimize the weight of and impart structural rigidity to the housing; and to provide other novel features and combinations and arrangements of parts in the new multiple-choice answer teaching apparatus as hereinafter disclosed and claimed.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

FIG. 3 is an enlarged sectional top plan view of the teaching apparatus shown in FIG. 1, the top wall or cover of the housing having been removed to show the operating parts therein;

FIG. 4 is a longitudinal vertical sectional view on line 4—4 in FIG. 1;

FIG. 6 is a transverse vertical sectional view on line 6—6 in FIG. 2 and showing certain of the parts of the new teaching apparatus including the manually operable circuit-closing devices embodied therein;

FIG. 7 is an enlarged sectional view on line 7—7 in FIG. 2, of the feed roller unit, parts thereof having been broken away;

FIG. 8 is a fragmentary sectional view, on line 8—8 in FIG. 6, showing part of the construction of the take-up roller unit and the latching means therefor;

FIG. 9 is a fragmentary sectional plan view of a portion of the novel question and answer-bearing paper web embodied in the invention;

FIG. 10 is a view, partly diagrammatic, illustrating the construction and arrangement of the manually operable circuit-closing and signal-actuating contact units embodied in the invention and the signal circuit in which they are embodied for actuating a signal device to indicate that the child has made a correct answer to the question;

FIG. 11 is an enlarged fragmentary sectional view, on line 11—11 in FIG. 3, illustrating the construction of the take-up roller unit, parts thereof having been broken away;

FIG. 12 is an enlarged vertical sectional view of one of the manually operable circuit-closing devices embodied in the invention and showing the same in open circuit position;

FIG. 13 is a sectional view on line 13—13 in FIG. 12;

FIG. 14 is a sectional detail view on line 14—14 in FIG. 7, showing part of the driving means for the feed roller;

FIG. 15 is an enlarged sectional view of a modified form of construction of the feed roller unit and of the take-up roller unit embodied in the invention;

FIG. 16 is a fragmentary perspective view of a modification of one feature of the invention, and in which a visible signal is employed in place of an audible signal, as in the form of the invention illustrated in FIGS. 1 to 14, inclusive; and FIG. 17 is a schematic diagram of the electrical circuit embodied in the modified form of the invention illustrated in FIG. 16.

Figure 1:
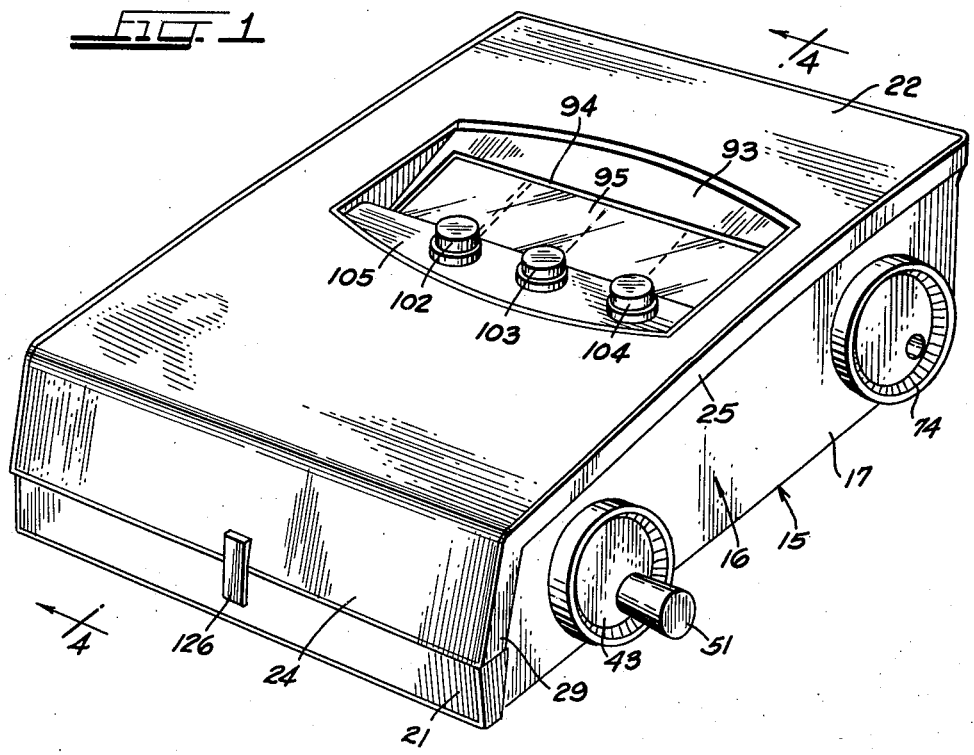
FIG. 1 is a perspective view of a teaching apparatus embodying a preferred form of the present invention as shown with the top wall or cover of the housing thereof in closed position.
Figure 5:
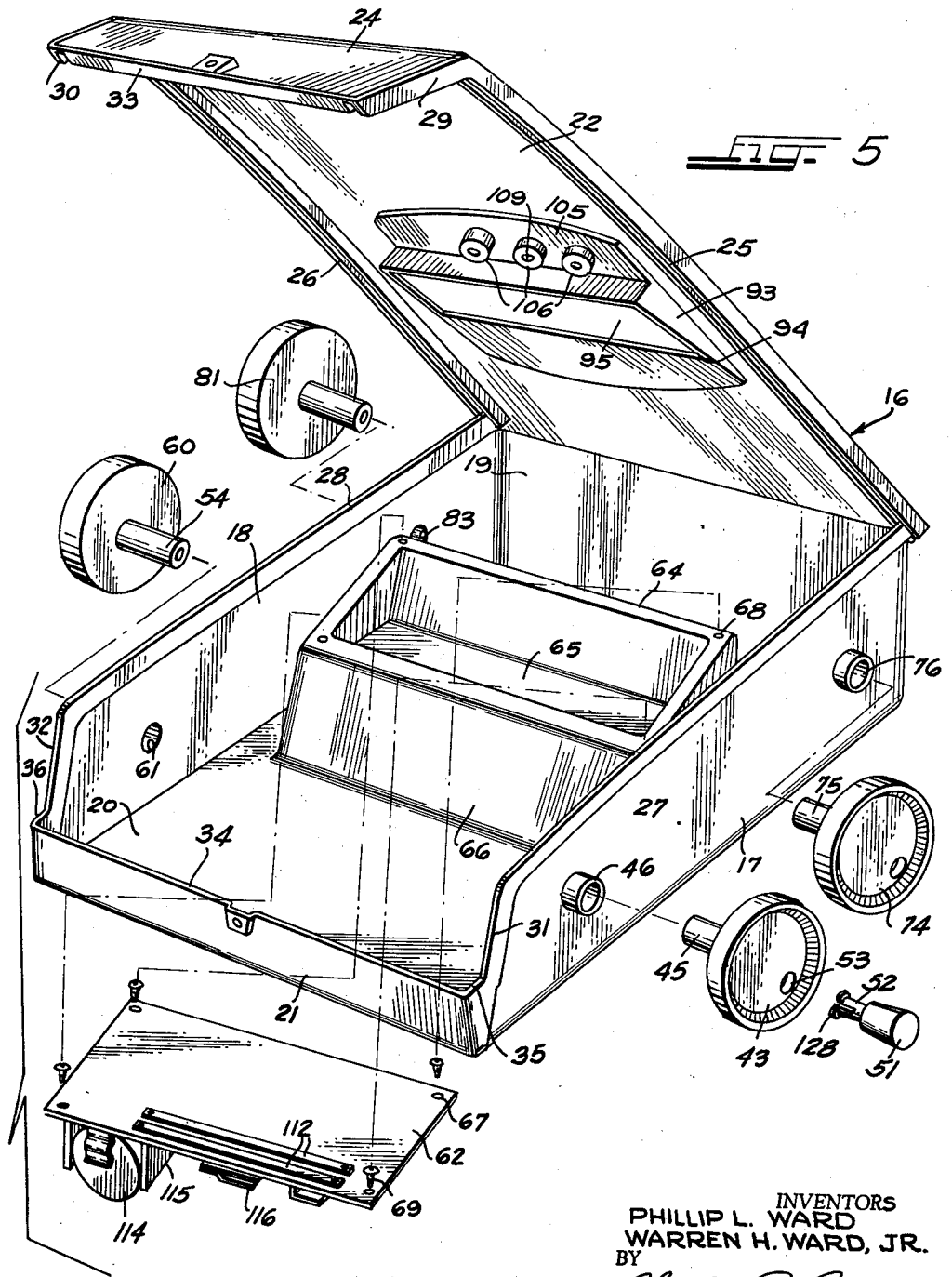
FIG. 5 is an exploded perspective view showing certain of the parts of the new teaching apparatus with the top wall or cover of the housing being shown in open position.

A preferred and typical embodiment of the invention is illustrated in FIGS. 1 to 14, inclusive, of the drawings, wherein it is generally indicated at 15, and comprises a housing 16 which is shown as being generally rectangular in form, and which may be made of any suitable and preferably light material such, for example, as molded synthetic plastic resinous sheet material, or it may be formed of sheet metal, such as aluminum, sheet steel, or the like, and which includes side walls 17 and 18, a rear wall 19, a bottom wall 20, and a front wall 21. The housing 16 has an open top and includes a movable inclined cover or top wall 22 which extends over the open top of the body of the housing 16 and is hingedly connected, as at 23, to the upper edge portion of the rear wall 19 (FIG. 5). The top wall or cover 22 includes a depending front wall portion 24 which extends partially down over the front end portion of the housing, as shown in FIGS. 1, 4 and 5, and a suitable latching device 126 may be associated with the parts 24–21 to latch the cover 22 in closed position. The top wall or cover 22 has a pair of longitudinally extending channel-shaped guide portions 25 and 26 formed on the outer lower edges thereof and these channel-shaped guide portions are adapted to receive relatively narrow upper edge portions 27 and 28, which are formed on the side walls 17 and 18, respectively. The channel-shaped guide portions 25 and 26 on the top wall or cover 22 of the housing 16 have downwardly angled end portions or extensions 29 and 30 at the front thereof and these downwardly angled front end portions 29 and 30 are adapted to receive angled downward extensions 31 and 32, respectively, which are disposed at the front ends of the side wall portions 27 and 28, respectively. The front lower edge portion 33 of the top wall or cover 22 is adapted to rest upon the upper edge portion 34 of the front wall 21 and upon a pair of horizontally extending shoulders 35 and 36 which are formed in the lower end portions of the front side wall portions 31 and 32, respectively, of the housing 16 (FIG. 5).

A paper web feed roller 37 is rotatably mounted in the front end portion of the housing 16 and has a pair of annular end flanges 38 and 39 mounted thereon at opposite ends thereof (FIGS. 3 and 7). The paper web feed roller 37 is best shown in FIG. 7 and is adapted to carry a question and answer-bearing paper web 40 which may be manually fed therefrom in a manner which will be described hereinafter. The annular end flange 38 on the paper feed roller 37 has an inwardly extending hub portion 41 formed integrally therewith and the other annular end flange 39 has a similar inwardly extending hub portion 42 thereon (FIG. 7). A manually operable knob 43 is provided for operating the feed roller 37 and the paper web 40 thereon, and this knob 43 has a central hub portion 44, to which is attached an inwardly extending shaft 45. The shaft 45 is journalled in a bearing opening 46 which is formed in the side wall 17 of the housing 16 and carries a driving cone 47, which may be made of molded synthetic plastic resinous material, rubber, or other suitable material, such as hereinafter described. The driving cone 47 is provided with an externally arranged annular row of beveled teeth 48 at its inner end and the teeth 48 are adapted to engage a corresponding row of beveled teeth 49 which are formed on the internal surface of the hub 41 of the feed roller 37, as shown in FIGS. 7 and 14. A washer 50 fixed on the shaft 45 inside the side wall 17 keeps the shaft 45 and the driving cone 47 thereon in assembled position and a lock washer 127 mounted on the inner end portion of the shaft 45 keeps the driving cone 47 in proper position on the shaft 45 (FIG. 7). The hand knob 43 has a rotatable crank handle 51 thereon, the rotatable crank handle 51 having a partially reduced, slotted and manually compressible inner end portion 52 which is rotatably and removably mounted in an opening 53 formed in the hand knob 43 (FIG. 5). The flange 128 on the inner end of the crank handle 51 keeps the crank handle 51 in assembled position on the hand knob 43 (FIGS. 5 and 7).

A shaft 54 is rotatably journalled in the side wall 18 of the housing 16, at the opposite end of the feed roller 37, and this shaft 54 carries a driving cone member 55 which is similar to the driving cone member 47 (FIG. 7). The driving cone member 55 has an annular row of beveled teeth 56 thereon which are adapted to engage a corresponding row of beveled teeth 57 formed on the inner surface of the hub 42 of the feed roller 37 (FIG. 7). The driving cone 55 and the beveled teeth 56 thereon are normally urged, by a coil spring 58 on the shaft 54, into engagement with the beveled teeth 57 on the hub portion 42 of the feed roller 37. A washer 59 is loosely mounted on the shaft 54, inwardly of the side wall 18, to serve as a bearing surface for the outer end portion of the coil spring 58, and a hand knob 60 is mounted on the shaft 54 outwardly of the side wall 18 of the housing 16 (FIGS. 3, 5 and 7); the shaft 54 being journalled in a bearing opening 61 in the side wall 18 (FIGS. 5 and 7). A lock washer 129 is fixedly mounted on the inner end portion of the shaft 54 and retains the driving cone 55 thereon against the force of the coil spring 58 (FIG. 7).

As shown in FIG. 4, the question and answer-bearing paper web 40 is adapted to travel over an inclined guideway 62 which is mounted in the housing 16, below the inclined top wall or cover 22, between the feed roller 37 and a take-up roller 63, which will be described hereinafter.

The inclined guideway is in the form of a generally rectangular-shaped plate 62 (FIGS. 4 and 5) which is mounted on the upper marginal edge portions 64 of a member 65 which is formed as a central upper portion of a member 66 which is formed as an integral molded re-entrant cavity in the bottom wall 20 of the housing 16 (FIGS. 4, 5 and 6). The guideway member or plate 62 may be attached to the upper marginal edge portions 64 of the member 65 in any suitable manner and one form of such attaching means is shown in the drawings (FIGS. 4, 5 and 6). Thus, for this purpose, the guideway member or plate 62 is provided with apertures 67 which are arranged in matching relationship with corresponding threaded openings 68 which are formed in the marginal edge portions 64 of the re-entrant cavity member 65, and screws 69 are inserted through the apertures 67 in the guideway member 62 and into the threaded openings 68 in the marginal edge portions 64 of the member 65 so as to hold the guideway member 62 in position of use thereon.

The take-up member 63 and its mounting in the housing 16 are similar to the construction and mounting of the feed roller 37, and the construction thereof is best shown in FIG. 11. Thus, by reference to FIG. 11, it will be noted that the take-up roller 63 has an annular end flange 70 at one end thereof and this end flange 70 has an inwardly extending hub portion 71 which extends into the body of the take-up roller 63. At its other end the take-up roller 63 is provided with a similar annular end flange 72 which has an inwardly extending hub portion 73 which extends into the body of the take-up roller 63. A manually operable knob 74 is mounted on the side wall 17 of the housing 16 and has an inwardly extending shaft 75 attached thereto. This shaft 75 is journalled in a bearing opening 76 formed in the side wall 17 of the housing 16 and the shaft 75 projects inwardly into the housing 16. This shaft 75 has a driving cone 77 thereon and the driving cone 77 has an annular row of beveled teeth 78 formed thereon at its inner end (FIG. 11). The teeth 78 on the driving cone 77 engage with complementary beveled teeth 79 which are formed internally on a conical-shaped surface 80 of the hub 71 of the take-up roller 70. A washer 125 is fixed on the shaft 75 within the side wall 17 and between the latter and the driving cone 77 and keeps the hand knob 74, shaft 75 and driving cone 77 in assembled position on the side wall 17 of the housing 16 (FIG. 11). Similarly, a lock washer 130 is mounted on the inner end portion of the shaft 75 and retains the driving cone 77 thereon.

A second manually operable knob 81, which is similar to the knob 74, is mounted at the other end portion of the take-up roller 63 and has a shaft 82 attached thereto which is similar to the shaft 75 of the hand knob 74, and this shaft 82 is journalled in a suitable bearing opening 83 in the side wall 18 of the housing 16. This shaft 82 has a driving cone 84 thereon and this driving cone 84 is provided with an annular row of beveled teeth 85 formed thereon at its inner end and this row of beveled teeth 85 engage a complementary row of beveled teeth 86 which are formed on a conical-shaped inner surface 87 of the hub portion 73 of the take-up roller 63 (FIG. 11). The driving cone 84 is urged, by a coil spring 119 on the shaft 82, into engagement with the hub portion 73 of the take-up roller 63 so as to engage the beveled teeth 85 and 86. A washer 88 is loosely mounted on the shaft 82, inwardly of the side wall 18 to provide a bearing surface for the outer end portion of the coil spring 119 and a lock washer 131 is fixedly mounted on the inner end portion of the shaft 82 to retain the driving cone 84 thereon against the force of the coil spring 119.

Retrograde movement of the take-up roller 63, and of the question and answer-bearing paper web 40 wound thereon, are prevented by a resilient latch dog member 89 which is pivotally mounted on the inner surface of the inclined top wall 22 of the housing 16, by means of a suitable fastening and pivot member 90 (FIGS. 3 and 8). This resilient latch dog member 89 has an arcuate-shaped downwardly curved end portion 91 which engages in teeth 92 which are formed as a rack on the peripheral edge of the annular flange 70 of the take-up roller 63 (FIG. 8). This arrangement is such, as best shown in FIGS. 3 and 8, that when the take-up roller 63 is rotated clockwise, as seen from the right-hand end in FIGS. 1, 4 and 8, the teeth 92 on the rack or gear 70 will pass under the resilient arcuate-shaped downwardly extending portion 91 of the resilient latch dog member 89 so as to enable the take-up roller 63 to be rotated to advance the question and answer-bearing paper web 40 from the feed roller 37, over the guideway 62, and onto the take-up roller 63, as best shown in FIGS. 3 and 4.

It wil be noted that the cover or top wall 22 of the housing 16 is inclined somewhat from its rear end to its front end, and that a well 93 is formed therein, as by molding it as an integral part of the top wall or cover 22, as shown in FIGS. 1 and 5. A sight opening 94 is closed by a transparent sight window 95 mounted therein; it being noted that the sight window 95 is inclined upwardly somewhat from its lower front end portion to its rear end portion, for a reason which will be pointed out presently. As shown, the sight window 95 is mounted in the top wall 22 of the housing 16 at a position located between the feed roller 37 and the take-up roller 63. The sight window 95 is of a size and shape such as to enable a relatively narrow section or single frame of the question and answer-bearing web 40 disposed immediately therebelow to be seen therethrough, as will be explained presently.

The question and answer-bearing paper web 40, as best shown in FIGS. 3 and 9, has printed or otherwise inscribed thereon, parallel rows 96 of question and answer-bearing areas which extend transversely across the web 40 in spaced relationship longitudinally thereof. Each row 96 is subdivided into a question-bearing frame 97 and a plurality of multiple-choice answer-bearing frames 98, 99 and 100 (FIGS. 3 and 9), so that there is a multiple-choice of answers 98-99-100 to the question in the frame 97 of each row of frames 96. The question-bearing frame 97 and the three answer-bearing frames 98-99-100 in one row of unit 96 thereof are all visible at the same time through the sight window 95 when that portion of the paper web 40 bearing one row 96 of the question and answer-bearing frames 97-98-99-100 is positioned over the guideway 62 and under the sight window 95 (FIG. 4).

A pattern of electrical contact-making apertures or holes 101 is provided in the paper web 40 and the pattern of these contact-making apertures or holes 101 is related to the arrangement of the answer-bearing frames 98-99-100 in the rows of question and answer-bearing frames 97-98-99-100. Thus, in the form of the invention shown, the apertures or holes 101 are staggered or offset laterally relative to each other in the paper web 40, that is to say, they are not arranged in alignment with each other transversely of the paper web 40 but are staggered laterally and are spaced from each other lengthwise or longitudinally of the web 40. The paper web 40 is provided with one of these contact-making apertures or holes 101 for each row 96 of question and answer-bearing frames 97-98-99-100, so that one of these contact-making apertures or holes 101 is disposed between each two adjacent rows 96 of question and answer-bearing frames 97-98-99-100 (FIGS. 3 and 9). Each of the contact-making apertures or holes 101 in the paper web 40 is aligned lengthwise of the paper web 40 with one of a group of manually operable electrical contact members or push buttons 102, 103 and 104 which are movably mounted in the front wall portion 105 of the well 93 in the top wall or cover 22 of the housing 16. These contact members or push buttons 102-103-104 are arranged in alignment with each other in a pattern or row thereof which extends transversely across the top wall or cover 22 of the housing 16 and adjacent to but forwardly of the sight window 95 relative to the direction of travel of the paper web 40 from the feed roller 37 to the take-up roller 63. To this end the front wall 105 of the well 93 in the top wall or cover 22 of the housing 16 is provided with a plurality of sockets 106 which extend inwardly thereof, and may be formed integrally therein, and one of the manually operable push button members 102, 103 and 104 is slidably mounted in each socket 106, as shown in FIGS. 4, 6, 12 and 13. Each of the manually operable push button members 102, 103 and 104 has a depending shaft 107 attached thereto and each of these shafts 107 is slidably mounted in an opening 108 which is formed in the transversely extending bottom wall 109 of each of the sockets 106. Each of the shafts 107 carries a resilient generally oval-shaped electrically conductive contact member 110 which is mounted thereon below the transverse bottom wall 109 of the socket 106. Each of these contact members 110 is normally urged upwardly, by a coil spring 111 which is mounted on each shaft 107 within the corresponding socket 106. A pair of stationary spaced parallel electrically conductive metallic contact bars or strips 112 are mounted on the upper surface of the inclined guideway member 62, over which the paper web 40 travels between the feed roller 37 and the take-up roller 63. These two stationary contact members or strips 112 are arranged in parallel relationship and extend transversely relative to the web 40, forwardly of the sight window 95 in the top wall 22 of the housing 16 relative to the direction of travel of the paper web 40 from the feed roller 37 onto the take-up roller 63. The stationary contact members or strips 112 are arranged in alignment, with the row of manually operable push button members 102, 103 and 104 and the contact members 110 carried thereby. Each of the manually operable contact members 110 is adapted to be projected through one of the contact-making apertures or holes 101 in the paper web 40 into engagement with, and so as to bridge or span, the two stationary contact strips or bars 112. It will be noted, in this connection, that only one of the contact-making apertures or holes 101 is associated with each group of answer frames 98, 99 and 100 in a question and answer row 96 so that when one row 96 of question and answer frames 97-98-99-100 comes into registry with the sight window 95 a single contact-making aperture or hole 101 is disposed immediately rearwardly of the aforesaid row 96 in alignment with the correct answer frame 99 (FIG. 3) in the row 96 and in alignment with a corresponding one of the manually operable push button members 102–103–104, as will be seen by refrence to FIGS. 1, 3 and 4 of the drawings, and the typical example therein shown.

The two stationary contact strips or bars 112 are embodied in an electrical circuit 113, shown in FIG. 10, and which includes a suitable source of electric current, such as a small electric battery 114, which, as shown in FIGS. 4, 5 and 6, is mounted on the bottom surface of the guideway member 62 by means of a suitable supporting bracket 115. The battery 114 is electrically connected in series in the circuit 113 with the two stationary contact strips or bars 112 and the electrical circuit 113 includes a suitable signal, which is shown, in the form of the invention illustrated in FIGS. 1 to 4, inclusive, as being in the form of an audible signal, such as a buzzer 116, or the like, mounted on the bottom surface of the guideway member 62.

Figure 2:
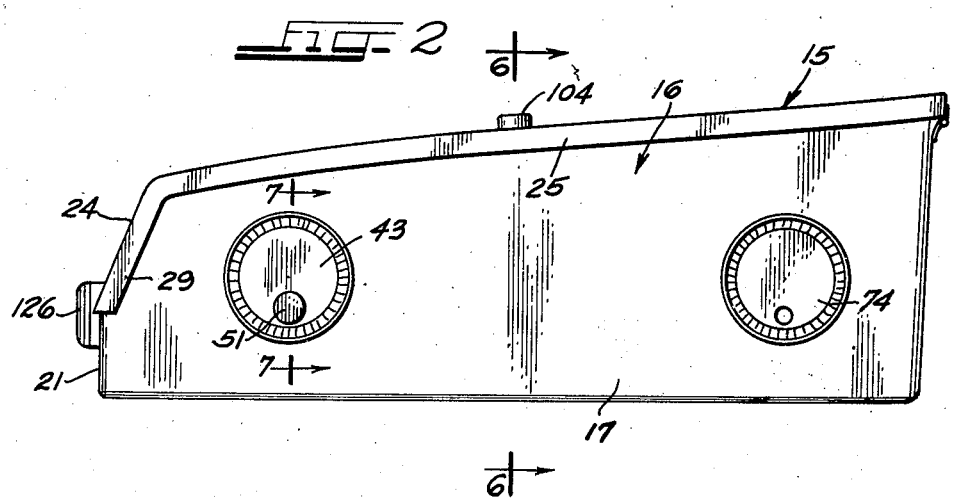
FIG. 2 is a side elevational view of the new teaching apparatus as seen from the right-hand side in FIG. 1.

In the use of the new teaching apparatus, as shown in FIGS. 1 to 4, inclusive, the housing 16 may be opened by manipulating the top wall or cover 22 and its depending front wall portion 24 upon its hinge 23 so as to insert the feed roller 37, and a roll of the question and answer-bearing paper web 40 thereon, into proper position in the housing 16. This is accomplished by manually inserting the hub portion 42 of the feed roller 37 onto the cone 55 and then sliding the feed roller 37 to the left, as seen in FIGS. 3 and 7, against the action of the coil spring 58, and then inserting the hub portion 41 of the feed roller 37 onto the driving cone 47 (FIG. 7). This action, under the force of the coil spring 58, engages the beveled teeth 48 on the driving cone 47 with the beveled internal teeth 49 on the hub 41 of the feed roller 37, while at the same time, the coil spring 58 urges the driving cone 55 into position to engage the beveled teeth 56 thereon with the beveled teeth 58 on the internal surface of the hub 42 (FIG. 7). The question and answer-bearing paper web 40 may then be fed from the feed roller 37 over the guideway member 62 and onto the take-up roller 63, whereupon the top wall or cover 22 of the housing 16 may be lowered into closed position, as shown in FIGS. 1 and 2.

With the parts thus arranged, the manually operable knobs 74 and 81, which are attached to the take-up roller 63, may be manipulated so as to advance the paper web 40 from the feed roller 37 over the guideway member 62.

As the paper web 40 is thus advanced, by manipulation of the hand knobs 74 and 81 of the take-up roller 63, the first row 96 of question and answer-bearing frames 97–98–99–100 is moved onto the upper surface of the guideway member 62 into a position below and generally coextensive with the sight window 95 in the top wall or cover 22 of the housing 16, so as to expose to the view of the child, through the sight window 95, the question which appears in the question-bearing frame 97 and the three possible answers thereto which appear in the answer-bearing frames 98–99–100, respectively, in one unit or row 96 thereof.

The child will thus have a multiple choice of three possible answers to the question, and after making his or her selection of the answer, the child selects a corresponding one of the three push button members 102, 103 and 104 and manually depresses the same. If the child has selected the correct answer to the question in the frame 97, the selected push button member 102, 103 or 104, when thus depressed, against the action of the corresponding coil spring 111, will act through its attached shaft 107 to force the resilient contact member 110 thereon down through one of the contact-making apertures or holes 101 in the paper web 40 into contact with and into position to span or bridge the two stationary contact members or strips 112 on the guide member 62. In the example shown in the drawings, the correct answer to the question in the frame 97 in the second row 96 from top in FIG. 3, is that indicated by the answer in the frame 99 and this frame 99 is associated with or aligned with one of the cut-out apertures or holes 101 in the paper web 40 (FIG. 3). Hence, the depression of the selected manually operable push button member 103, which is associated with the correct answer-bearing frame 99, through the contact-making aperture or hole 101 in the paper web 40 causes the movable contact member 110 on the shaft 107 of the selected push button 103 to engage and bridge the two stationary contact strips 112, thereby closing the circuit 113 and energizing the audible signal 116 and thus indicating to the child that he or she has made the correct selection of the multiple choice of answers to the question in the frame 97.

On the other hand, if the child makes an incorrect selection of the multiple choice of answers to the question in frame 97, and pushes down on the corresponding one of the manually operable push button members (102 or 104), the manually operable push button member (102 or 104) thus incorrectly selected, being out of alignment with all of the contact-making apertures or holes 101 in the web 40, will merely act, through its shaft 107 thereon, to depress the corresponding resilient contact member 110 attached thereto into engagement with a portion of the paper web 40, which is disposed over the stationary contact members 112 on the guideway 62.

Hence, the circuit 113 and the signal 116 therein will not be energized, with the result that the child will thus be advised that he or she has made the wrong selection of an answer to the question posed in the frame 97 of the paper web 40. Thus, in the example shown in the drawings, and in the position of the parts as shown therein, the selection of either of the two answers in frames 98 and 100, and the depression of either of the two push-button members 102 or 104, respectively, aligned therewith, would be an erroneous selection of the answer to the question in frame 97 and would result in the circuit 113 and signal 116 not being energized.

After each operation, the paper web 40 may be advanced, by the manually operable knobs 74 and 81 on the take-up roller 63, to bring another row or unit 96 of question and answer-bearing frames 97–98–99–100 (FIG. 3) into registry with the sight window 95.

It is impossible for a child to move the paper web 40 backward for the purpose of attempting to make a second selection of an answer to a question previously answered erroneously because of the engagement of the flexible portion 91 of the resilient latch dog member 89 with the teeth 92 in the rack or gear 70 on the take-up roller 63. However, forward movement of the take-up roller 63, and the paper web 40 thereon, is possible due to the fact that the teeth 92 on the rack or gear 70 will move under the downwardly angled resilient portion 91 of the latch dog member 89 when the child manipulates the take-up roller 63 by means of the knobs 74 and 81 thereon (clockwise as seen from the right in FIGS. 1 and 2).

After a roll of the question and answer-bearing paper web 40 has been exhausted, the top wall or cover 22 of the housing 16 may be opened on its hinge 23 and the take-up roller 63 removed from its mountings by manually pushing the take-up roller 63 to the left (FIG. 11) against the action of the spring 119, so as to enable the hub portion 71 of the take-up roller 63 to be slipped off the cone 77 of the take-up roller 63 and thereby enable the take-up roller 63 to be removed from the housing 16 and the roll of the paper web 40 removed and rewound onto the feed roller 37 or to enable a new and different roll of the question and answer-bearing paper web 40 to be wound onto the feed roller 37 and the operation of the new teaching device thus repeated, as desired.

As shown in FIGS. 3 and 8, the latch dog 89–91 may be manipulated laterally on its pivot 90 so as to swing the angled lower end portion 91 thereof out of latching engagement with the teeth 92 on the rack 70, whereupon the web 40 may be moved both forward and backward while the cover 22 is closed if and when a small child should have difficulty stopping the paper web 40 at the proper place relative to the sight window 95. This manipulation of the latch dog 89–91 may be accomplished by the child's parent, by lifting the cover or top wall 22 of the housing 16, and swinging the latch dog 89–91 laterally on its pivot 90. This may be desirable in certain instances to prevent the child from having a feeling of frustration.

To rewind the web 40 from the take-up roller 63 back onto the feed roller 37, the top wall or cover 22 may be left open or raised so that the latch dog 89–91 is not engaged with the teeth of the rack 70, or the latch dog 89–91 may be disengaged from the teeth 92 of the rack 70, as above described, and the feed roller 37 rotated by grasping the crank handle 51 on the knob 43 and rotating the feed roller 37 (clockwise, FIGS. 1 and 4). During this operation, the external beveled teeth 48 on the driving cone 47 engage the internal beveled teeth 49 on the hub portion 41 of the feed roller 37 and, at the same time, the internal beveled teeth 57 on the hub 42 of the feed roller 37 engage the external beveled teeth 56 on the cone 55 of the shaft 54 to effect a positive driving action of the feed roller 37 and to prevent slippage of the parts.

It will be noted that the beveled teeth 78 on the driving cone 77 on the drive shaft 75 on the knob 74, which engage the beveled internal teeth 79 on the conical hub portion 71 of the take-up roller 63, and the beveled teeth 85 on the cone 84 on the drive shaft 82 of the knob 81, which engage the internal beveled teeth 86 on the conical hub portion 73 of the annular flange 72 of the take-up roller 63, provide for positive driving action of the take-up roller 63 by the hand knobs 74 and 81 thereon and thus prevents slippage of the parts.

It will be noted that the inclined upper surface of the top wall or cover 22 of the housing 16 and the upward inclination of the sight window 95 in the well 93 permits the child to read easily the question and the multiple choice of answers in each row 96 of question and answer-bearing frames 97–98–99–100 while, at the same time, the remaining parts of the web 40 are completely obscured from the view of the child by the cover 22 and the body of the housing 16.

In addition, the arrangement of the push buttons 102, 103 and 104 in the front wall 105 of the well 93 in the top wall 22 of the housing 16 enables them to be readily seen and operated by a child.

The provision of the re-entrant central cavity 66 in the body of the housing 16, and the formation of the well 65 therein to house the parts arranged therein, and to provide a support for the guideway 62, tends to minimize the weight of and lends structural rigidity to the housing 16, while, at the same time, providing a support and enclosure for the guideway 62 and associated parts while also providing mounting wells or spaces for the feed roller 37 and the take-up roller 63.

A modified form of construction for the feed roller 37 and the take-up roller 63 is illustrated in FIG. 15 of the drawings and this form of roller construction may be employed in place of either the feed roller 37 or the take-up roller 63. The form of roller construction shown in FIG. 15 is substantially similar to the form of feed roller 37 and the take-up roller 63, and will be described only as used in place of the feed roller 37, and those parts thereof which are similar to corresponding parts in the feed roller 37 have been given the same reference numerals followed by the additional and distinguishing reference character "a."

Thus, in the form of roller construction shown in FIG. 15 the crank handle 51 is eliminated and the hand knob 43a is provided with an inwardly extending hollow shaft 45a, which is preferably molded integrally therewith, and this shaft 45a has a conical-shaped inner end portion 120 which is provided with a row of beveled teeth 48a which engage a row of beveled teeth 49a formed on the external surface of a conical-shaped hub portion 121 of the end wall or annular flange 38a of the roller 37a. Similarly, the hand knob 60a has an inwardly extending hollow shaft 54a preferably molded integrally therewith, and this shaft 54a has a conical-shaped inner end portion 122 which is provided with a row of beveled teeth 56a which engage a correspondingly shaped row of beveled teeth 57a formed on a conical-shaped hub portion 123 of the end wall or annular flange 39a of the roller 37a.

The use and operation of the form of roller construction shown in FIG. 15 are substantially similar to the use and operation of the feed roller 37 and take-up roller 63 and the driving action of the roller 37a is accomplished by the engagement of the row of beveled teeth 48a with the correspondingly shaped row of beveled teeth 49a on the conical-shaped hub portion 121 of the end wall 70a of the roller 37a in cooperation with the engagement of the beveled teeth 56a on the conical-shaped inner end portion 123 of the shaft 54a with the correspondingly shaped row of beveled teeth 57a on the conical-shaped hub portion 123 of the end wall 39a of the roller 37a.

A modification of another feature of the invention is illustrated in FIGS. 16 and 17 of the drawings and those parts thereof which are similar to or comparable to corresponding parts in the form of the invention illustrated in FIGS. 1 to 14, inclusive, have been given the same reference numerals followed by the adidtional and distinguishing reference character "b."

In the modification illustrated in FIGS. 16 and 17, the construction and operation of the parts are substantially similar to the construction and operation of the parts in the form of the invention shown in FIGS. 1 to 14, inclusive, except that in this form of the invention a visible signal in the form of a small electric lamp 117 is provided in the circuit 113b in place of the audible signal 116 in the form of the invention illustrated in FIGS. 1 to 14, inclusive, and a small sight window 118 is provided in the top wall 22b of the cabinet 16b immediately above the visible signal or lamp 117 (FIGS. 16 and 17).

It will thus be seen from the foregoing description, considered in conjunction with the accompanying drawings, that the present invention provides a new and improved and relatively simple multiple choice teaching apparatus for use with school children of the lower grammar school grades, and thus has the desirable advantages and characteristics, and accomplishes its intended objects, including those hereinbefore pointed out and others which are inherent in the invention.

We claim:

1. A teaching apparatus comprising a housing including side walls, a rear wall, a bottom wall, and a top wall or cover having a sight window therein, a feed roller and a take-up roller rotatably mounted in the housing in spaced relationship on opposite sides of said sight window, a question and answer-bearing web movably mounted in the said housing for movement under said sight window from the said feed roller onto the said take-up roller, means for manually rotating the said take-up roller to advance the said web from the said feed roller onto the said take-up roller, said question and answer-bearing web having a question-bearing frame and answer-bearing frame thereon, the said question and answer-bearing web also having contact-making apertures or holes formed therein at intervals lengthwise thereof and the said contact-making apertures or holes being arranged in staggered relationship laterally of the said web and being spaced from each other lengthwise of the said web, and electrical circuit in the said housing including a signal device and a plurality of manually operable electric switch members movably mounted in said top wall or cover of the said housing in spaced relationship laterally thereof, and in alignment with the said answer-bearing frames, said electrical circuit including relatively stationary electrical contact means arranged in the said housing below the said web and below the said manually operable switch members, an electrical contact member operatively connected with each of the said manually operable switch members and said contact members being aligned laterally of the said web with the said contact-making apertures or holes in the said web and being selectively movable by said switch members into engagement with the body of said web in the event of the selection of an incorrect answer to a question on the said web but being selectively movable through one of the said contact-making apertures or holes in the said web into engagement with the said stationary contact means to energize the said electrical circuit and the said signal device to indicate the correct selection of the answer to a multiple choice of answers to the said question on the said web as seen through the said sight window, the said means for manually rotating the said take-up roller including a hub portion formed in the said take-up roller at one end thereof and having gear means thereon, a shaft rotatably mounted in a side wall of the said housing and having a hand knob thereon outwardly of the said housing, the said take-up roller having a hub portion thereon at one end thereof, the said shaft having gear means thereon engageable with the said gear means on the said hub portion of said take-up roller for positively driving the latter, the said take-up roller having an annular gear rack thereon, resilient latching means mounted in the said housing below the said top wall or cover thereof and coacting with the said take-up roller for preventing retrograde movement of the latter, the said resilient latching being pivotally mounted in the said housing and having a downwardly angled lower end portion engageable with the said gear rack on the said take-up roller, and said latching being adapted to be pivoted laterally out of position to engage the said gear rack on said take-up roller so as to permit retrograde rotation of said take-up roller.

2. A teaching apparatus comprising a housing including side walls, a rear wall, a bottom wall, and a top wall or cover having a sight window therein, a feed roller and a take-up roller rotatably mounted in the housing in spaced relationship on opposite sides of said sight window, a question and answer-bearing web movably mounted in the said housing for movement under said sight window from the said feed roller onto the said take-up roller, means for manually rotating the said take-up roller to advance the said web from the said feed roller onto the said take-up roller, said question and answer-bearing web having a question-bearing frame and answer-bearing frame thereon, the said question and answer-bearing web also having contact-making apertures or holes formed therein at intervals lengthwise thereof and the said contact-making apertures or holes being arranged in staggered relationship laterally of the said web and being spaced from each other lengthwise of the said web, an electrical circuit in the said housing including a signal device and a plurality of manually operable electric switch members movably mounted in said top wall or cover of the said housing in spaced relationship laterally thereof, and in alignment with the said answer-bearing frames, said electrical circuit including relatively stationary electrical contact means arranged in the said housing below the said web and below the said manually operable switch members, an electrical contact member operatively connected with each of the said manually operable switch members and said contact members being aligned laterally of the said web with the said contact-making apertures or holes in the said web and being selectively movable by said switch members into engagement with the body of said web in the event of the selection of an incorrect answer to a question on the said web but being selectively movable through one of the said contact-making apertures or holes in the said web into engagement with the said stationary contact means to energize the said electrical circuit and the said signal device to indicate the correct selection of the answer to a multiple choice of answers to the said question on the said web as seen through the said slght window, the said top wall or cover of the said housing being hingedly mounted on the said housing, the said teaching apparatus including resilient latching means pivotally mounted on the said top wall of the said housing on the bottom surface thereof, gear means on the said take-up roller, the said resilient latching means coacting with the said gear means on the said take-up roller for preventing retrograde movement of the latter, and the said resilient latching means being adapted to be pivoted laterally out of position to cooperate with the said take-up roller so as to permit retrograde rotation of the said take-up roller.

References Cited by the Examiner
UNITED STATES PATENTS

| 1,180,966 | 4/16 | Barthold | 281—8 |
| 2,030,175 | 2/36 | Le Fevre | 35—9 |
| 2,062,453 | 12/36 | Hastings | 35—9 |
| 2,169,266 | 8/39 | Matter | 35—9 |
| 2,467,051 | 4/49 | Reffner | 35—76 |
| 2,663,091 | 12/53 | Brown | 35—9 |
| 2,720,038 | 10/55 | Clark | 35—9 |
| 3,067,931 | 12/62 | Mosse | 35—9 |
| 3,122,844 | 3/64 | Kharasch et al. | 35—9 |

EUGENE R. CAPOZIO, *Primary Examiner.*

LEO SMILOW, LAWRENCE CHARLES, JEROME SCHNALL, *Examiners.*